Sept. 2, 1947.    C. C. S. LE CLAIR    2,426,739
PIPE JOINT OR CONNECTOR
Filed Dec. 1, 1944    2 Sheets-Sheet 2
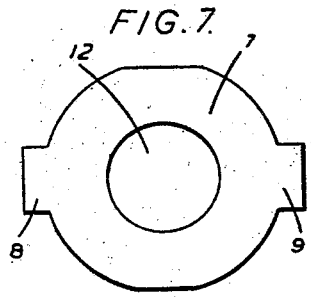
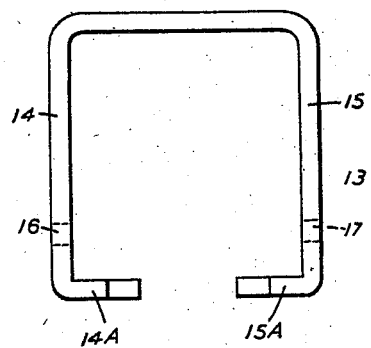
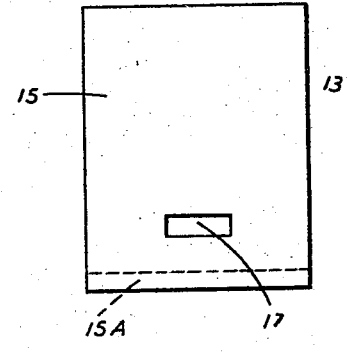
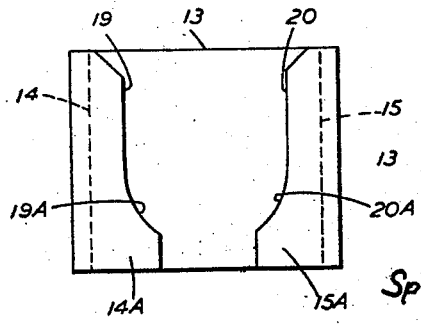
Camille Clare
Sprankling Le Clair
Inventor Patented Sept. 2, 1947

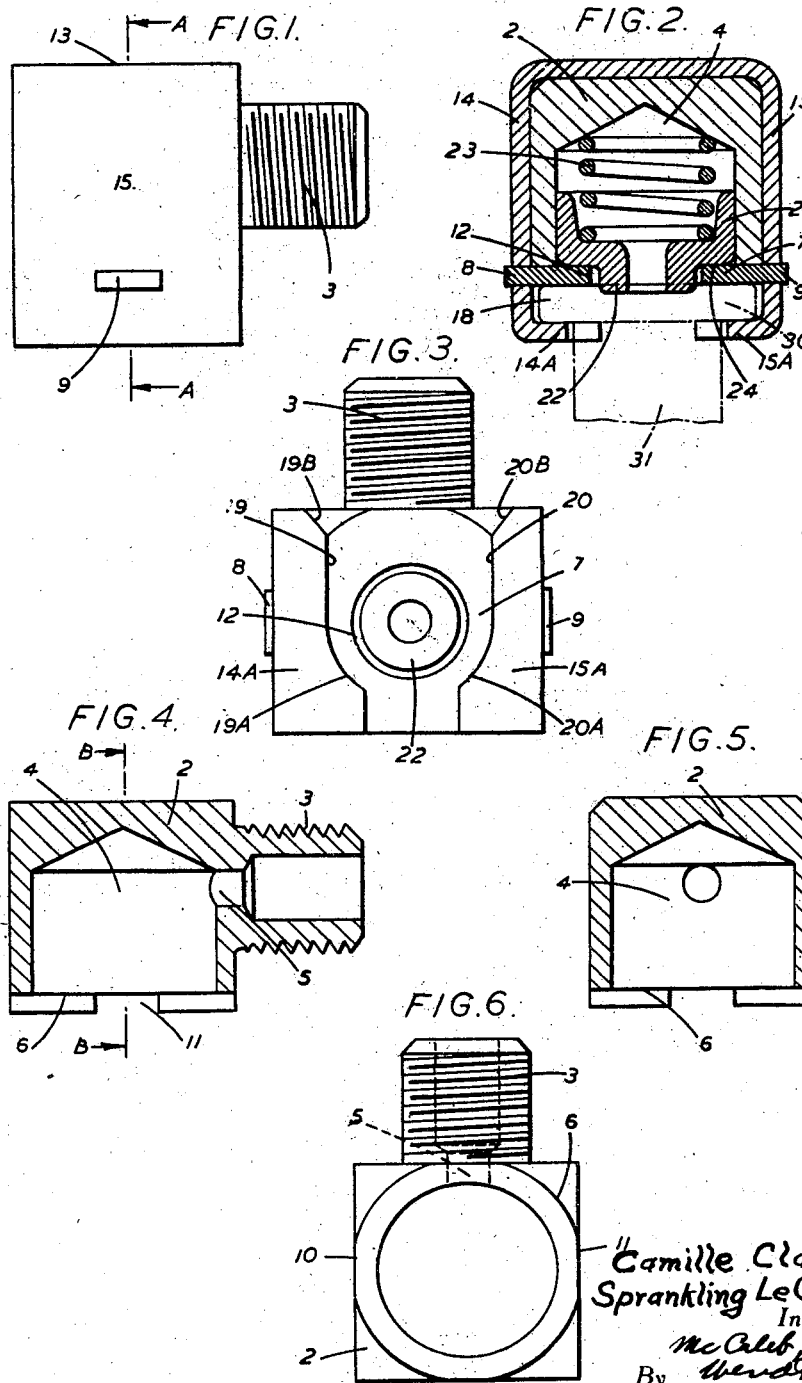

2,426,739

UNITED STATES PATENT OFFICE 2,426,739

PIPE JOINT OR CONNECTOR

Camille Clare Sprankling Le Clair,
London, England

Application December 1, 1944, Serial No. 566,168
In Great Britain December 24, 1943

5 Claims. (Cl. 285—143)

1

This invention relates to pipe joints or connectors for use in detachably connecting a liquid or lubricant supply conduit to the flanged head of a liquid or lubricant-receiving fitting or nipple. The invention is more particularly concerned with nozzles for use in detachably connecting the discharge conduit of a grease gun or other lubricating apparatus to flanged nipples through which the lubricant is fed to the parts to be lubricated.

The object of the present invention is to improve, simplify and cheapen the manufacture of such pipe joints, connectors or nozzles, all of which will be referred to hereinafter simply as "nozzles," largely by avoiding the necessity for machining ports and passages from the solid.

According to the present invention, a nozzle comprises a hollow body part adapted to be connected to the liquid or lubricant discharge conduit of a liquid or lubricant dispensing apparatus and formed with a liquid or lubricant inlet, through which the liquid or lubricant is fed from the said conduit to the interior of the body part, a clip member adapted partially or wholly to embrace the body part and to provide jaws whereby the nozzle may be detachably attached to the liquid or lubricant nipple by a pull-on or push-on movement, an apertured sealing member arranged in the interior of the body and adapted to make sealing contact with the flanged, apertured head of the liquid or lubricant nipple, and a facing member which serves to retain the said clip member on the body and to limit the outward movement of the sealing member, the flanged head of the liquid or lubricant nipple being engaged in the space between the facing member and the said jaws of the clip member when the nozzle is engaged with the nipple.

The clip member may consist of a clip of spring-metal which is shaped to embrace part or all of the nozzle body. The free ends of the sides of the clip are turned inwards so as to form flanges or lugs which are spaced from the bottom of the body and also spaced from each other. They are thus adapted to engage and hold the flanged head of the liquid or lubricant nipple, and are also shaped to act as jaws adapted to engage on and be guided by opposite sides of the nipple body below the flanged head. The said facing member may consist of a flat disc fitted in the bottom of the nozzle body and provided with lugs adapted to engage in holes or slots in the said spring clip so as to retain the latter upon the body. The said sealing member is preferably made of flexible material and comprises a

2 cup shaped part slidably arranged in the nozzle body above the facing member and a short, apertured nipple end which projects downwards through a central hole formed in the said facing member. It is also preferred to fit a spring within the hollow nozzle body, so that the face of the said nipple end will be forced into sealing contact with the head of the liquid or lubricant nipple partly under the action of the said spring.

One constructional form of the invention is shown, by way of example, on the accompanying drawings, whereon:

Fig. 1 is a side elevation of the nozzle;
Fig. 2 is a section on the line A—A in Fig. 1;
Fig. 3 is a bottom plan view of the nozzle;
Fig. 4 is a longitudinal sectional view of the nozzle body;
Fig. 5 is a section on the line B—B in Fig. 4;
Fig. 6 is a bottom plan view of the body;
Fig. 7 is a plan view of the facing member;
Fig. 8 is a side view of the spring clip;
Fig. 9 is a front view of the clip; and
Fig. 10 is a bottom plan view of the clip.

Referring to the drawings:

This constructional form of the invention is applied to a nozzle of the hook-on type, and comprises a housing 1 formed with a metallic, rectangular body 2 and with a hollow cylindrical ferrule 3 adapted to be attached to a hose or pipe forming, or adapted to be connected to, the discharge conduit of a grease gun or other lubricating apparatus (not shown) either directly or through a knuckle or swivel joint. The body is formed with a central recess 4 which is open at the bottom of the body but closed at the top, and with a port 5 which provides communication between the recess and the hollow ferrule. The bottom face of the body is formed with a circular recess 6, see Figs. 4 to 6, which is of larger diameter than the central recess 4 in the body and which acts as a seating for a facing member 7, Fig. 7, in the form of a flat metal disc. The latter is provided with two opposed laterally-projecting lugs 8 and 9, and the diameter of the seating 6 in the body is such that it cuts the sides of the body, thereby providing two spaces 10 and 11 in which the lugs are fitted, the lugs being peened over after the facing member has been assembled. The facing member 7 is also formed with a central hole 12 of less diameter than the central recess 4 in the body.

The nozzle also comprises a spring clip 13, Figs. 8 to 10, which is made from a flat strip of metal bent to embrace the top and two sides of the body. The sides 14 and 15 of the clip are longer than the sides of the body and they are formed respectively with slots 16 and 17 in which the adjacent lugs 8 and 9 on the facing member 7 are engaged. The free ends of the sides 14 and 15 of the clip are turned inwards in such a position below the facing member that a space 18, see Fig. 2, is formed between each of the inturned ends or flanges 14A and 15A of the clip and the facing member, the depth of the two spaces being such that the flanged head 30 of the nipple 31 can be engaged therein when the nozzle is to be connected to the nipple. The edges of the inturned flanges 14A and 15A of the spring clip are also formed with straight parts 19 and 20 terminated at one end by parts 19A and 20A curved to a radius slightly larger than that of the body of the nipple just below the flanged head, the centres of curvature of both curved ends being coincident and also coincident with the axis of the nipple. The straight parts 19 and 20 of the two flanges together form a parallel entry slot the width of which is slightly larger than the diameter of the body of the nipple below the flanged head. The leading corners 19B and 20B may for convenience be chamfered as shown. Thus, the inturned flanges 14A and 15A of the spring clip 13 may be engaged on the nipple below the flanged head by a hook-on movement, the curved ends 19A and 20A of said flanges acting as a means for limiting the engaging movement of the nozzle relative to the nipple and the chamfered corners 19B and 20B acting to permit easy engagement.

A sealing member 21 is slidably arranged in the central recess 4 in the body 2 and comprises a cup-shaped ring or washer of rubber, synthetic rubber or equivalent flexible material, and an apertured downwardly-projecting end flange or protuberance 22. The latter normally projects slightly through the hole 12 in the facing member 7 under the action of a coil spring 23, which is arranged in the central recess 4 in the nozzle body and acts between the closed end of the recess and the bottom of the cup-shaped part of the sealing washer, the downward movement of the latter being limited by the contact of a shoulder 24 on the washer with the facing member.

If desired, the sealing member 21 may normally be seated in a circular recess formed in the top of the facing member 7 concentrically with the hole 12 in the latter.

The spring clip 13 may be assembled on the nozzle body 2 with the curved ends 19A and 20A of the recesses in the flanges adjacent to or remote from the hollow ferrule 3 on the body. Thus, the nozzle may be made up for attachment to the nipple by either "push-on" or "pull-on" motion as preferred.

I claim:
1. A nozzle adapted removably to fit onto the flanged and apertured head of a nipple to provide a connection through which liquid or lubricant is fed from the discharge conduit of dispensing apparatus to a receiving surface and comprising, in combination, a hollow body provided with an interior passage, a clip embracing the body, an apertured sealing member mounted in the hollow body for engaging the head of said nipple to make a substantially sealed connection therewith, and a facing member for holding the clip on the body and retaining the sealing member, said clip having end and side portions engaging exterior surfaces of the body and inwardly projecting and opposed end flanges spaced from the body and shaped to form jaws for engagement with opposite sides of the nipple adjacent the head thereof, whereby the nozzle may be removably attached to a nipple by the application of force laterally of the body and longitudinally of said jaws.

2. A nozzle as defined in claim 1 and wherein said inwardly projecting and opposed flanges have curved inner edges of a shape such that they provide stops at one side of the nozzle for effecting properly aligned location of the nozzle relative to a nipple.

3. A nozzle as defined in claim 1 and wherein said body has a recessed end surface, said clip has slots in the side portions thereof and adjacent the recessed end surface of the body, and said facing member has a mid-portion shaped to fit into the recess in the body and lugs projecting outwardly therefrom through said slots.

4. A nozzle as defined in claim 1 wherein said hollow body opens outwardly toward the facing member, said facing member has an opening therethrough of smaller size than the opening in the body, and said sealing member comprises a substantially cup-shaped element fitting snugly into the opening in the body and an end protuberance normally projecting outwardly through said opening in the facing member for contacting a nipple to which the nozzle is applied.

5. A nozzle as defined in claim 1 wherein said hollow body opens outwardly toward the facing member, said facing member has an opening therethrough of smaller size than the opening in the body, said sealing member comprises a substantially cup-shaped element fitting snugly into the opening in the body and an end protuberance normally projecting outwardly through said opening in the facing member for contacting a nipple to which the nozzle is applied, and resilient means within said hollow body for biasing the sealing member toward the facing member.

CAMILLE CLARE SPRANKLING LE CLAIR.

REFERENCES CITED

The following references are of record in the file of this patent:

UNITED STATES PATENTS

| Number | Name | Date |
|---|---|---|
| 2,332,390 | Davis | Apr. 3, 1939 |
| 2,243,605 | Richardson | May 27, 1941 |

FOREIGN PATENTS

| Number | Country | Date |
|---|---|---|
| 839,390 | France | Apr. 3, 1939 |
| 749,516 | France | July 25, 1933 |